UNITED STATES PATENT OFFICE.

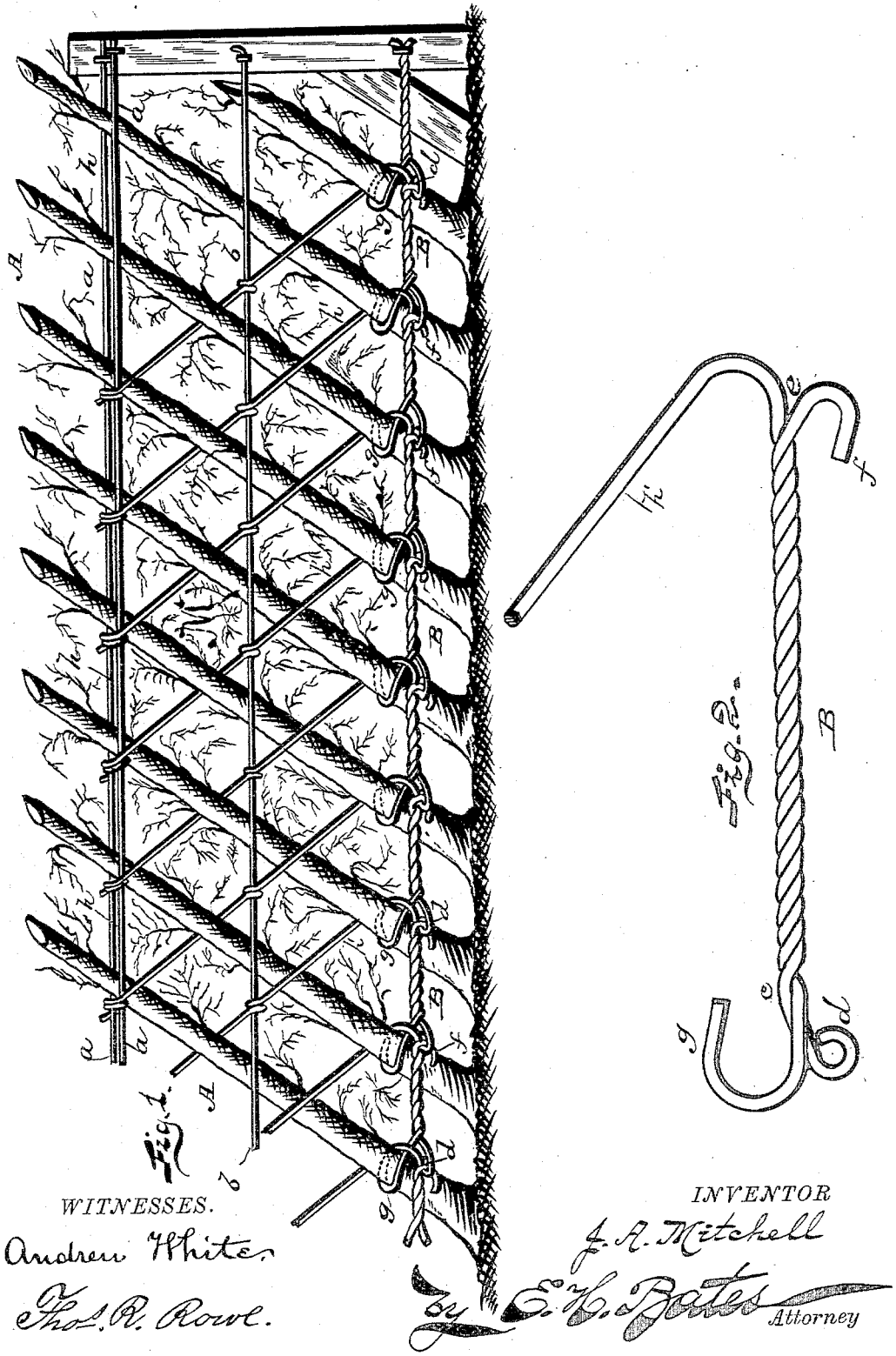

JAMES A. MITCHELL, OF WESTMINSTER, MARYLAND.

HEDGE.

SPECIFICATION forming part of Letters Patent No. 380,450, dated April 3, 1888.

Application filed January 5, 1888. Serial No. 259,891. (No model.)

*To all whom it may concern:*

Be it known that I, JAMES A. MITCHELL, a citizen of the United States, residing at Westminster, in the State of Maryland, have invented certain new and useful Improvements in Hedges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in hedges; and it consists in providing a hedge with a tie and plashing wire of novel construction, as will be hereinafter fully explained, and pointed out in the appended claim.

The annexed drawings, to which reference is made, fully illustrate my invention, in which—

Figure 1 represents a front view of a hedge showing my improvement; and Fig. 2 is a perspective view of the wire detached from the hedge.

Referring by letter to the accompanying drawings, A designates a hedge or living fence which is bent on an incline, as shown.

*a a* represent two wires running horizontally, being one on each side of the stalks; and *b* indicates an intermediate horizontal wire.

B designates the tying and plashing wire, which also serves as a lower rail or line wire for the hedge, as shown in Fig. 1 of the drawings. This tying and plashing wire is of peculiar construction. The same consists of a long and short wire, which are twisted together to form, when so twisted, a single wire. The end *c* of the longest wire is bent into an eye, *d*, while the opposite end or portion extending from the twist is left plain, as at *h'*, and the end *e* of the shortest wire is provided or bent into a hook, *f*, while the opposite end of said wire is also provided with a hook, *g*, which is somewhat larger than the hook *f*, all for a purpose which I will now explain.

The plashing-wires are applied to the hedge in sections commencing at the end post, to which one end of the wire is secured. The opposite end thereof is then carried to the trunk of the first stalk, which is grasped by the larger hook, after which the next section or wire is attached to the hedge by connecting the small hook with the eye on the adjacent section and carrying the long wire around or partly around the trunk of said stalk, thence upwardly and obliquely to the top wire. This oblique wire is given one turn around the intermediate line-wire, and at the top is bent around the two top line-wires, thereby connecting the latter and forming a loop, *h*, through which the upper ends of the stalks project, and which serves to hold said stalks in the desired oblique position. Each section of the tie-wires are connected and arranged one after the other, in the manner above described, until the fence is completed. In placing the oblique wire it is preferable to plash it in and out of the stalks. Thus it will be seen that an impenetrable hedge is provided, and is durable as well as cheap to construct.

What I claim is—

In a hedge, the within-described plashing-wire, consisting of a long wire and a short wire twisted together, as shown, having at one end the eye *d* and hook *g* and at the opposite end the hook *f* and extended portion *h'*, said hooks and eyes of the portion B being adapted to be connected to the adjacent wire and the extended end to be carried around the stalk and diagonally upward and connected to the line-wire *a*, as shown and described.

In testimony whereof I affix my signature in presence of two witnesses.

JAMES A. MITCHELL.

Witnesses:
 JOHN N. WALKER,
 EMORY H. BATES.